(12) United States Patent
Nagasawa (10) Patent No.: US 11,173,869 B2
(45) Date of Patent: Nov. 16, 2021

(54) AIRBAG DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 32 days.

(21) Appl. No.: 16/752,813

(22) Filed: Jan. 27, 2020

(65) Prior Publication Data

US 2020/0307504 A1 Oct. 1, 2020

(30) Foreign Application Priority Data

Mar. 29, 2019 (JP) .............................. JP2019-066276

(51) Int. Cl.
*B60R 21/36* (2011.01)
*B60R 21/00* (2006.01)

(52) U.S. Cl.
CPC .............. *B60R 21/36* (2013.01); *B60R 21/00* (2013.01); *B60R 2021/0004* (2013.01)

(58) Field of Classification Search
CPC ... B60R 21/23; B60R 21/00; B60R 2021/004; B60R 21/261; B60R 21/36; B60R 21/2646; B60R 21/2644; B60R 2021/2607; B60R 2021/21654
See application file for complete search history.

(56) References Cited

U.S. PATENT DOCUMENTS

| 8,408,350 | B2 | 4/2013 | Wilmot et al. | |
| 8,662,237 | B2* | 3/2014 | Chung | B60R 21/239 180/274 |
| 9,566,936 | B2* | 2/2017 | Biller | B60R 21/276 |
| 10,434,973 | B2* | 10/2019 | Gandhi | B60R 21/0134 |
| 2006/0163856 | A1* | 7/2006 | Lehmann | B60R 21/239 280/743.1 |
| 2008/0143521 | A1* | 6/2008 | Hyde | B60R 21/36 340/540 |
| 2010/0059972 | A1* | 3/2010 | Kim | B60R 21/36 280/728.2 |
| 2010/0116580 | A1* | 5/2010 | Choi | B60R 21/36 180/274 |
| 2012/0267183 | A1 | 10/2012 | Wilmot et al. | |

FOREIGN PATENT DOCUMENTS

| JP | 2010-235007 | 10/2010 |
| JP | 2012-229014 | 11/2012 |

* cited by examiner

*Primary Examiner* — James A English
*Assistant Examiner* — Kurtis Nielson
(74) *Attorney, Agent, or Firm* — Smith, Gambrell & Russell, LLP (57) ABSTRACT

An airbag device is to be mounted on a vehicle and includes an airbag, an inflator, and a deformation member. The airbag configured to expand and deploy outward of the vehicle. The inflator configured to supply expansion gas into the airbag. The deformation member provided in the airbag and configured to be deformed by heat of the expansion gas supplied from the inflator.

20 Claims, 6 Drawing Sheets

AIRBAG DEVICE

CROSS-REFERENCE TO RELATED APPLICATIONS

The present application claims priority from Japanese Patent Application No. 2019-066276 filed on Mar. 29, 2019, the entire contents of which are hereby incorporated by reference.

BACKGROUND

The disclosure relates to an airbag device configured to deploy in front of a vehicle, and more specifically to an airbag device configured to protect a walker and a person riding on a two-wheeler (hereinafter referred to as "pedestrian").

Conventionally, in order to protect a pedestrian in a collision with a vehicle, there have been known an airbag device including airbags configured to be deployed and expanded in front of front pillars of the vehicle disclosed, for example, in Japanese Unexamined Patent Application Publication No. 2010-235007, and an airbag device including an airbag configured to be deployed and expanded in front of a bumper of the vehicle disclosed, for example, in Japanese Unexamined Patent Application Publication No. 2012-229014.

SUMMARY

An aspect of the disclosure provides an airbag device to be mounted on a vehicle. The device includes an airbag, an inflator, a deformation member. The airbag is configured to expand and deploy outward of the vehicle. The inflator is configured to supply expansion gas into the airbag. The deformation member is provided in the airbag and configured to be deformed by heat of the expansion gas supplied from the inflator.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. For the airbag device to protect a pedestrian, there has been a demand to effectively absorb the impact of a collision with a vehicle because, in general, the impact on the pedestrian is greater than that on a passenger in the vehicle.

In particular, when a person riding on a two-wheeler including a bicycle collides with a vehicle, the velocity of the vehicle relative to the bicycle is fast, and there is not enough time for them to sense a danger, and therefore it may not be possible to take on the behavior to securely avoid the collision. Consequently, the impact on the person riding on the two-wheeler in a collision with the vehicle is increased, and therefore it is supposed to reduce the injury of the pedestrian.

To address this, it is conceivable to provide a large airbag device configured to deploy in front of the vehicle. Here, the size of the airbag body is increased, the capability to absorb the impact is increased, but the airbag body in contact with the pedestrian is rotated as a caterpillar around the gas contained in the airbag body. This may cause the pedestrian to slide out of the airbag body of the vehicle. In this case, the airbag cannot absorb the displacement of the passenger relative to the vehicle, so that the pedestrian is thrown down from the vehicle. Consequently, the pedestrian may collide with the road surface as a second collision.

It is desirable to provide an airbag device capable of preventing a pedestrian in a collision with a vehicle from sliding on an airbag while effectively absorbing the impact of the collision.

The airbag device is configured to deploy in front of a vehicle to reduce the injury of a protection target person that is a pedestrian in a collision with the vehicle.

Figure 1:
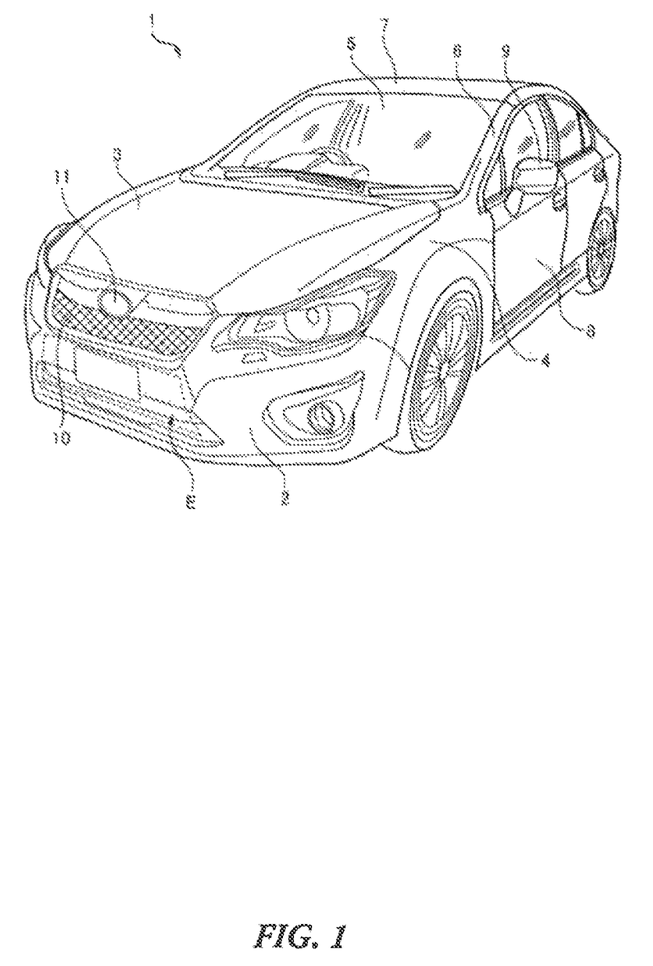
FIG. 1 is a perspective view illustrating a vehicle equipped with an airbag device.
Figure 2:
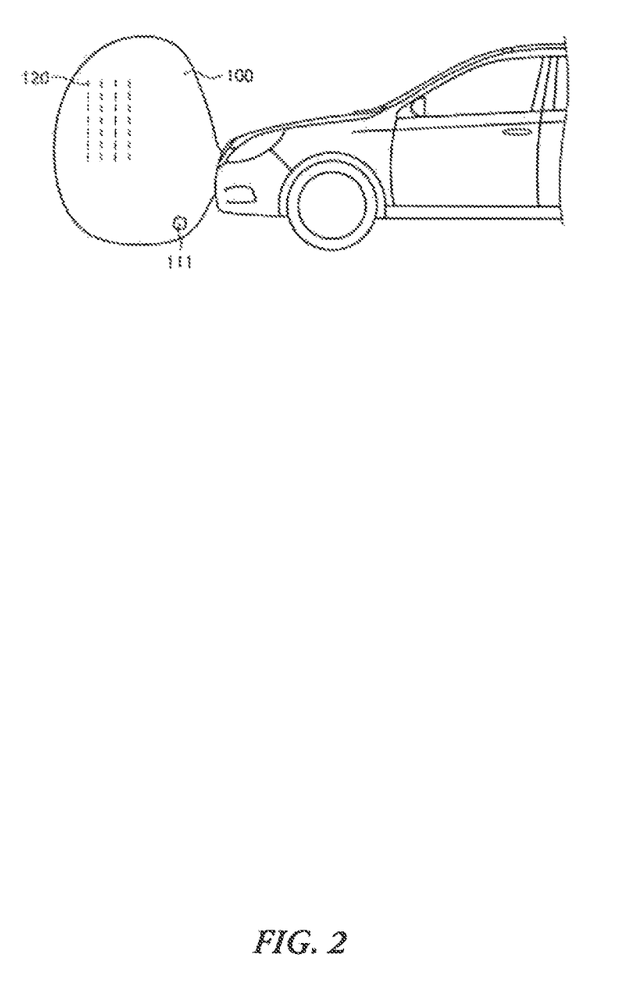
FIG. 2 is a side view illustrating the vehicle when an airbag of the airbag device is deployed.

FIG. 1 is a perspective view illustrating a vehicle 1 equipped with an airbag device E. FIG. 2 is a side view illustrating the vehicle 1 when an airbag of the airbag device E is deployed.

As illustrated in FIGS. 1 and 2, the vehicle 1 equipped with the airbag device E has an external structure including a front bumper 2 on the front end of the vehicle 1, a bonnet 3 above and behind the front bumper 2, a front fender 4 on the side of the bonnet 3, a wind shield 5 behind the bonnet 3, a front pillar 6 on the side edge of the windshield 5, a roof 7 as the ceiling of the vehicle 1, a side door 8 in the side surface of the vehicle 1, and a side mirror 9 on the upper part of the side door 8.

In addition, a front grille 10 configured to take air into the bonnet 3 and a decorative emblem 11 are provided above the front bumper 2.

The airbag device E is provided in (behind) the front bumper 2, and an airbag 100 is folded and stored in the front bumper 2. Here, the airbag device E may be provided not in the front bumper 2 but in (behind) the front grille 10.

The airbag device E includes the airbag 100 formed by a base cloth made of synthetic fabric such as nylon fabric, and an inflator (not shown) configured to supply expansion gas into the airbag 100.

When it is predicted that a protection target person collides with the vehicle 1, the airbag device E actuates the inflator to supply the expansion gas into the airbag 100, and therefore to expand the airbag 100. At this time, the front bumper 2 is removed by the pressure of the expanded airbag 100.

Then, as illustrated in FIG. 2, the airbag 100 of the airbag device E expands and deploys in front of the vehicle 1 from the front bumper 2.

Deformation members 120 configured to be deformed by the heat of the expansion gas supplied from the inflator is provided in the airbag 100.

The deformation members 120 are formed by a heat-shrinkable material such as polystyrene, polyester, and polyvinyl chloride which is shrunk by the heat of the expansion gas. The deformation members 120 may be formed by thermally expandable members that are expanded by mixing a foaming agent such as polypropylene, sodium hydrogen carbonate, ammonium carbonate, diazoaminobenzene, and dinitrosopentamethylenetetramine and applying the heat of the expansion gas.

The airbag 100 includes a discharge port 111 configured to be open to communicate with the outside of the airbag 100. The expansion gas in the airbag 100 is discharged to the outside from the discharge port 111.

Next, the internal structure of the airbag 100 will be described.

Embodiment 1

Figure 3A:
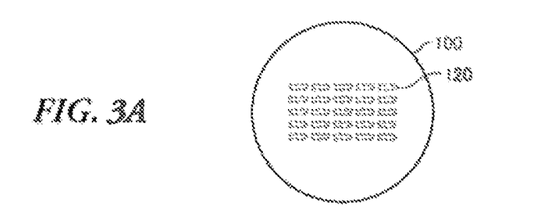
FIGS. 3A-3C illustrate the airbag according to Embodiment 1.
Figure 3B:
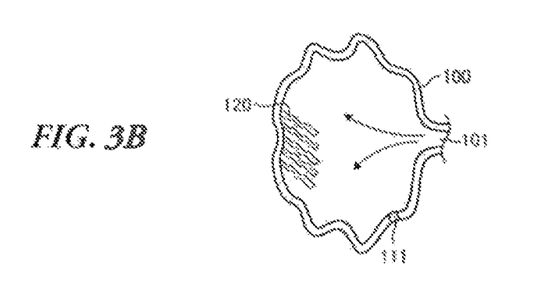
Figure 3C:
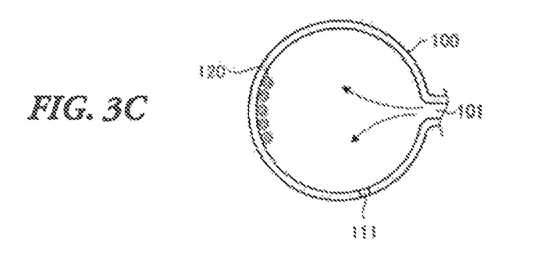

FIGS. 3A-3C illustrate the airbag 100 according to Embodiment 1.

FIG. 3A is a front view illustrating the airbag 100 in a front view of the vehicle 1. FIG. 3B is a cross-sectional schematic view illustrating the airbag 100 before the deformation members 120 shrink, taken along the front-to-back direction of the vehicle 1. FIG. 3C is a cross-sectional schematic view illustrating the airbag 100 after the deformation members 120 shrink, taken along the front-to-back direction of the vehicle 1.

As illustrated in FIG. 3A, the deformation members 120 are provided in the center of the inner wall of the airbag 100 in a front view of the vehicle 1.

In addition, as illustrated in FIG. 3B, each of the deformation members 120 is formed as strings, and one end of the deformation member 120 is coupled to the inner wall of the front part of the airbag 100. Here, FIG. 3B is a cross-sectional schematic view illustrating the airbag 100 which has not been completely expanded before the deformation member 120 does not shrink. However, in fact, the deformation member 120 has started to shrink when the airbag is starting to expand.

When the expansion gas is supplied from the inflator into the airbag 100, the deformation members 120 shrink and curl up to form balls on the inner wall due to the heat of the expansion gas as illustrated in FIG. 3C.

Here, the expansion gas from the inflator is supplied into the airbag 100 via the supply port 101, and the discharge port 111 is provided in the lower and back part of the airbag 100. By this means, the expansion gas in the airbag 100 is discharged from the discharge port 111 to the outside of the airbag 100, and therefore the expanded airbag 100 can be deformed in a collision with the protection target person.

As described later, when the expanded airbag 100 can be deformed in a collision with the protection target person, the deformation members 120 shrunk and curled up as balls rub against the inner wall of the airbag 100, and the deformation members 120 rub against and are intertwined with each other. As a result, a large frictional force is generated, and therefore it is possible to prevent the protection target person from sliding on the airbag 100 in a collision with the vehicle 1 while effectively absorbing the impact.

Moreover, the deformation members 120 are provided in the center of the front part of the airbag 100 which is easily contacted by the protection target person, and therefore it is possible to allow the deformation members 120 to effectively generate a frictional force.

Here, with Embodiment 1, the deformation members 120 may be coupled to the inner wall of the center of the front part of the airbag 100, but this is by no means limiting. The deformation members 120 may be coupled to approximately the entire area of the inner wall of the airbag 100. Alternatively, the deformation members 120 may be attached to a specific part except the lower and back part of the airbag 100.

Embodiment 2

FIGS. 4A-4D illustrate the airbag 100 according to Embodiment 2 where deformation members 130 which are shrunk by the heat of the expansion gas are provided near the supply port 101 through which the expansion gas is supplied, instead of the deformation members 120 coupled to the inner wall of the airbag 100.

FIGS. 4A-4D are cross-sectional schematic views illustrating the airbag 100 taken along the front-to-back direction of the vehicle 1, where the states of the deformation members 130 and the airbag 100 are illustrated in chronological order.

Figure 4A:
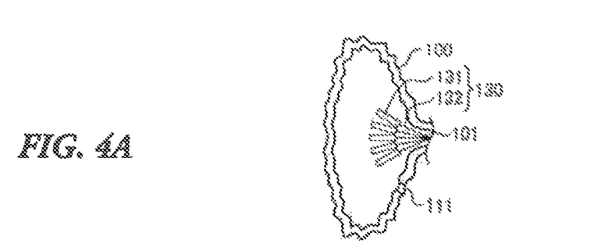
FIGS. 4A-4D illustrate the airbag according to Embodiment 2.

As illustrated in FIG. 4A, the deformation members 130 are provided near the supply port 101 through which the expanded gas is supplied.

Each of the deformation members 130 includes a reed-shaped deformation main body 131 and a thin connecting string 132 coupled to the supply port 101.

As illustrated in FIG. 4A, when the expansion gas is starting to be supplied from the supply port 101, the deformation main bodies 131 spread in the airbag 100 due to the wind pressure of the expansion gas.

Figure 4B:
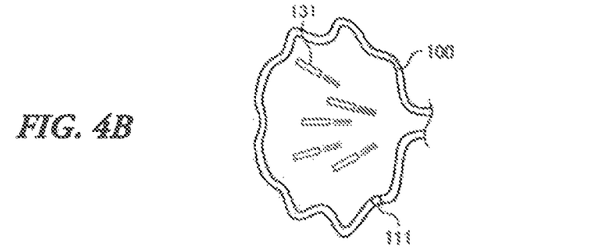

Then, as illustrated in FIG. 4B, as the temperature in the airbag 100 is increased by supplying a predetermined amount of the expansion gas from the supply port 101, the connecting strings 132 are cut by the wind pressure and the heat of the expansion gas, and consequently the deformation main bodies 131 are scattered in the airbag 100.

Figure 4C:
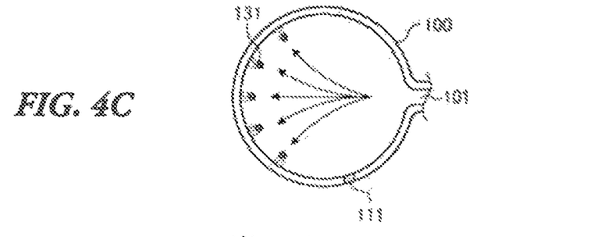

After that, the deformation main bodies 131 are fusion-bonded to the inner wall of the airbag 100 as illustrated in FIG. 4C.

Figure 4D:
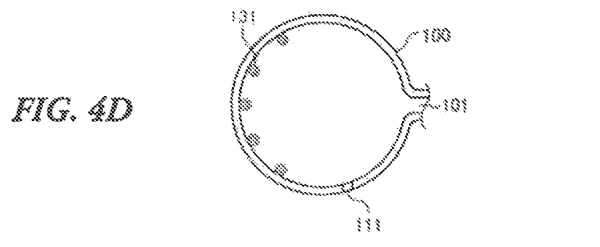

Finally, as illustrated in FIG. 4D, the shrinkage of the deformation main bodies 131 progresses on the inner wall of the airbag 100 due to the heat of the expansion gas, and consequently the deformation main bodies 130 are formed into balls as, for example, curly strings, with many surface protrusions.

Also with Embodiment 2, when the expanded airbag 100 can be deformed in a collision with the protection target person, the deformation main bodies 130 shrunk and curled up as balls rub against the inner wall of the airbag 100. As a result, a large frictional force is generated, and therefore it is possible to prevent the protection target person from sliding on the airbag 100 in a collision with the vehicle 1 while effectively absorbing the impact.

Here, with Embodiment 2, the deformation member 130 is constituted by the reed-shaped deformation main body 131 and the thin connecting string 132, but this is by no means limiting. The deformation member 130 may be constituted by the deformation main body 131 formed into a spherical shape, a flat plate shape, or a disk shape without the connecting string 132 coupled to the supply hole 101. Here, it is desired that the deformation main body 131 includes a wind catcher configured to catch the wind pressure of the expansion gas supplied from the supply port 101.

Moreover, with Embodiment 2, in order to prevent the fusion-bonding of the deformation members 130, it is desired that the shrinkage temperature or the thermal expansion temperature of the deformation members 130 is higher than the temperature in the airbag 100 when the expansion gas is starting to be supplied from the supply port 101.

<Form Change of Airbag>

A mechanism capable of effectively absorb the impact of a collision of the protection target person with the vehicle 1 by using the airbag 100 according to Embodiments 1 and 2 will be described with reference to FIGS. 5A-5B.

Figure 5A:
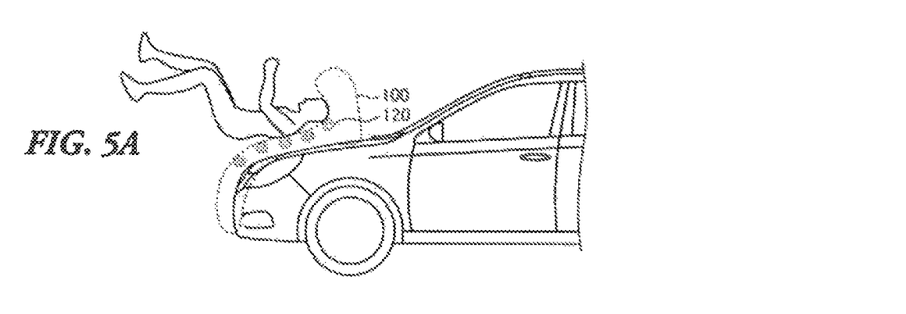
FIGS. 5A-5B are schematic views illustrating the form change of the airbag when a protection target person collides with the airbag.
Figure 5B:
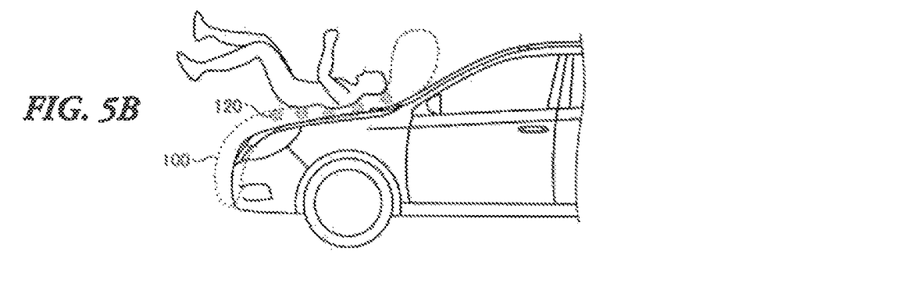

FIGS. 5A-5B are schematic views illustrating the form change of the airbag 100 when the protection target person collides with the airbag 100.

As illustrated in FIG. 5A, in the case of a collision of the protection target person with the vehicle 1, the protection target person first collides with the airbag 100, and then the airbag 100 is deformed by the impact from the protection target person.

At this time, the deformation members 120 shrunk and curled up as balls are formed on the inner wall of the airbag 100, and rub against the inner wall of the airbag 100. By this means, the deformation members 120 generate a large frictional force in the airbag 100 as illustrated in FIGS. 5A-5B.

As a result, it is possible to prevent the protection target person from sliding on the airbag 100 in a collision with the vehicle 1 while effectively absorbing the impact, and therefore to reduce the injury of the protection target person.

<Modification>

With Embodiments 1 and 2, one airbag 100 is expanded and deployed in front of the vehicle 1, and a great frictional force is generated in the airbag 100, but this is by no means limiting. Another airbag may be provided.

Figure 6:
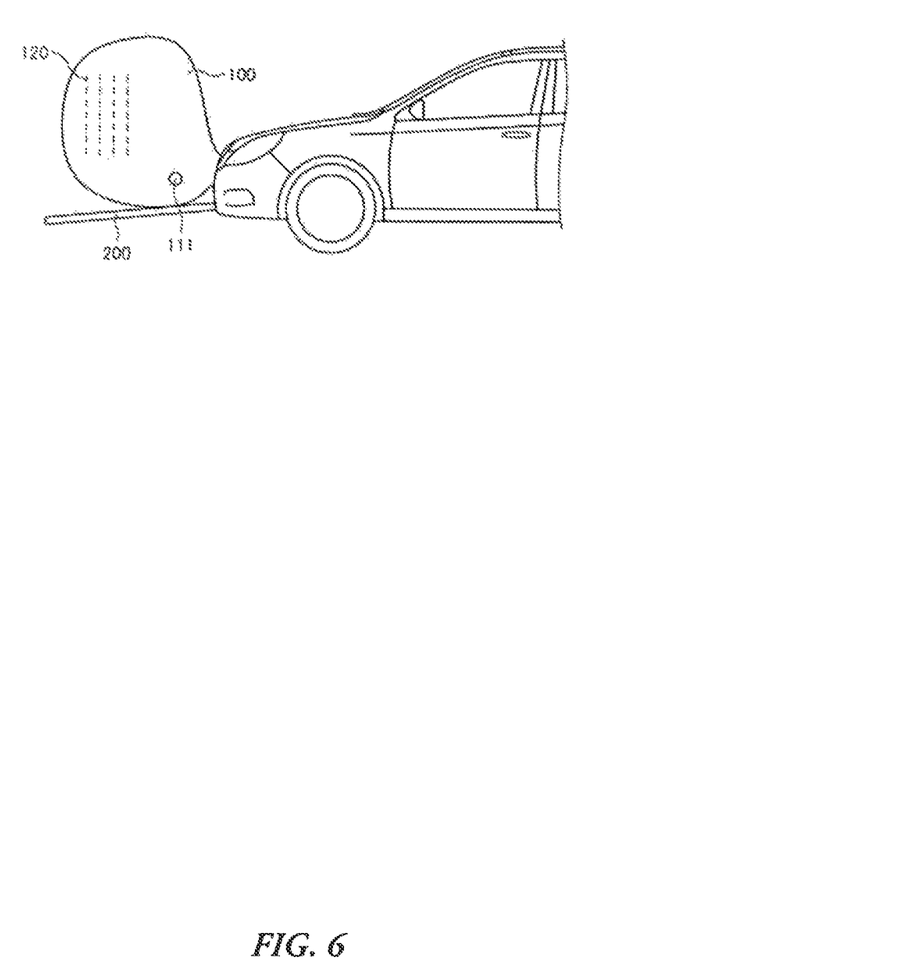
FIG. 6 is a side view illustrating the vehicle with the airbag according to a modification of Embodiments 1 and 2.

For example, as illustrated in FIG. 6, a thin semi-elliptical or rectangular airbag 200 may be provided under the airbag 100 in front of the vehicle 1.

Here, the front end of the airbag 200 is deployed ahead of the front end of the airbag 100 in the front-to-back direction of the vehicle 1. Moreover, the upper end of the airbag 200 is located on the same level or under the knees of the protection target person. By this means, the airbag 200 can function to sweep the feet of the protection target person.

By adding the airbag 200 to the airbag 100, the airbag 200 first sweeps the feet of the protection target person to cause the protection target person to slump against the airbag 100. Then, it is possible to effectively absorb the impact on the protection target person by the frictional force generated in the airbag 100.

Although there are various collision manners of the protection target person, the airbag 200 sweeping the feet of the protection target person allows the protection target person to slump against the airbag 100, and therefore it is possible to predict the collision manner, and therefore to effectively absorb the impact.

As described above, the airbag device E can prevent the protection target person in a collision with the vehicle 1 from sliding on the airbag 100 while effectively absorbing the impact, and therefore can reduce the injury of the protection target person.

The invention claimed is:

1. An airbag device to be mounted on a vehicle, the airbag device comprising:
    an airbag configured to expand and deploy outward of the vehicle;
    an inflator configured to supply expansion gas into the airbag; and
    a deformation member provided in the airbag and configured to be deformed by heat of the expansion gas supplied from the inflator, and wherein the deformation member is shrunk by the heat of the expansion gas supplied from the inflator.

2. The airbag device according to claim 1, wherein the deformation member is coupled to an inner wall of the airbag.

3. The airbag device according to claim 2, wherein the deformation member is coupled to an inner wall of a contact part of the airbag that is easily contacted by a protection target person when the vehicle collides with the protection target person.

4. The airbag device according to claim 2, wherein the deformation member is formed as a string, and one end of the deformation member is coupled to the inner wall of the airbag.

5. The airbag device according to claim 1, wherein the deformation member is coupled to an inner wall of a front part of the airbag.

6. The airbag device according to claim 1, wherein the deformation member is coupled to an inner wall of a contact part of the airbag that is easily contacted by a protection target person when the vehicle collides with the protection target person.

7. The airbag device according to claim 1, wherein the deformation member is formed as a string, and one end of the deformation member is coupled to an inner wall of the airbag.

8. The airbag device according to claim 1, further comprising
    a supply port through which the expansion gas is to be supplied into the airbag,
    wherein the deformation member is disposed near the supply port.

9. An airbag device to be mounted on a vehicle, the airbag device comprising:
    an airbag configured to expand and deploy outward of the vehicle;
    an inflator configured to supply expansion gas into the airbag; and
    a deformation member provided in the airbag and configured to be deformed by heat of the expansion gas supplied from the inflator, and wherein the deformation member, when the airbag is in a full deployment state, is supported only by the airbag.

10. The airbag device according to claim 9, wherein the deformation member is coupled to an inner wall of the airbag.

11. The airbag device according to claim 10, wherein the deformation member is formed as a string, and one end of the deformation member is coupled to the inner wall of the airbag.

12. The airbag device according to claim 9, wherein the deformation member is coupled to an inner wall of a front part of the airbag.

13. The airbag device according to claim 9, wherein the deformation member is coupled to an inner wall of a contact part of the airbag that is easily contacted by a protection target person when the vehicle collides with the protection target person.

14. The airbag device according to claim 9, wherein the deformation member is formed as a string that extends to a greater extent in a front-to-rear direction than in a lateral direction, and one end of the deformation member is coupled to an inner wall of the airbag.

15. The airbag device according to claim 9, further comprising
  a supply port through which the expansion gas is to be supplied into the airbag,
  wherein the deformation member is disposed near the supply port and includes a connector that releases during expansion gas supply as to enable free floating of the deformation member within the airbag interior.

16. The airbag device according to claim 9, wherein the deformation member is shrunk by the heat of the expansion gas supplied from the inflator.

17. The airbag device according to claim 9, wherein said deformation member is one of a plurality of deformation members contained in the airbag.

18. An airbag device to be mounted on a vehicle, the airbag device comprising:
  an airbag configured to expand and deploy outward of the vehicle;
  an inflator configured to supply expansion gas into the airbag; and
  a deformation member provided in the airbag and configured to be deformed by heat of the expansion gas supplied from the inflator, and wherein the deformation member, upon deforming, has a ball shape.

19. The airbag device according to claim 18, wherein the deformation member is coupled to an inner wall of a contact part of the airbag that is easily contacted by a protection target person when the vehicle collides with the protection target person.

20. The airbag device according to claim 18, wherein the deformation member has an initial string configuration and is shrunk by the heat of the expansion gas supplied from the inflator into the ball shape.

* * * * *